United States Patent
Khatana et al.

(10) Patent No.: US 8,644,420 B2
(45) Date of Patent: *Feb. 4, 2014

(54) ALIGNMENT OF IN-PHASE AND QUADRATURE DATA IN QUADRATURE PHASE SHIFT KEYING OPTICAL TRANSMITTERS

(75) Inventors: Sunil Kumar Singh Khatana, Sunnyvale, CA (US); Lee Dardis, San Jose, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 13/078,733

(22) Filed: Apr. 1, 2011

(65) Prior Publication Data

US 2012/0250792 A1 Oct. 4, 2012

(51) Int. Cl.
H04L 27/20 (2006.01)
(52) U.S. Cl.
USPC .......................................... 375/308; 375/296
(58) Field of Classification Search
USPC .................. 375/308, 298, 261, 296; 332/103; 398/188; 455/23, 42, 210
See application file for complete search history.

(56) References Cited

U.S. PATENT DOCUMENTS

| 5,802,451 | A * | 9/1998 | Adachi et al. | 455/126 |
| 7,969,254 | B2 * | 6/2011 | Azarian | 332/144 |
| 8,428,183 | B2 * | 4/2013 | Khatana et al. | 375/308 |
| 2006/0280264 | A1 | 12/2006 | Isaac et al. | |
| 2008/0187073 | A1 | 8/2008 | Lampe et al. | |
| 2008/0219339 | A1 * | 9/2008 | Chrabieh et al. | 375/231 |
| 2009/0036079 | A1 | 2/2009 | Lindoff et al. | |
| 2009/0148170 | A1 * | 6/2009 | Perkins | 398/152 |
| 2010/0209121 | A1 * | 8/2010 | Tanimura | 398/202 |
| 2011/0075761 | A1 * | 3/2011 | Kuwata | 375/296 |
| 2011/0116558 | A1 | 5/2011 | Otaka et al. | |
| 2012/0039421 | A1 * | 2/2012 | Chrabieh et al. | 375/340 |

FOREIGN PATENT DOCUMENTS

WO WO2009147891 12/2009

OTHER PUBLICATIONS

Patent Cooperation Treaty, International Search Report and Written Opinion for International Patent Application No. PCT/US2012/031143, mailed Jun. 4, 2012, 11 pages.
Authorized Officer H. Filip. International Search Report and Written Opinion in International Application PCT/US2012/031135, dated Apr. 6, 2012, 11 pages.

* cited by examiner

*Primary Examiner* — Aristocratis Fotakis
(74) *Attorney, Agent, or Firm* — Fenwick & West LLP (57) ABSTRACT

I/Q data skew in a QPSK modulator may be detected by sending identical or complementary data streams to I and Q channel PSK modulators, setting the relative carrier phase between I and Q to zero or π, and monitoring the average QPSK output power, where the data streams sent to the I and Q channels include streams of alternating ones and zeroes.

15 Claims, 9 Drawing Sheets

ALIGNMENT OF IN-PHASE AND QUADRATURE DATA IN QUADRATURE PHASE SHIFT KEYING OPTICAL TRANSMITTERS

TECHNICAL FIELD

The disclosure is generally related to optical communications systems and in particular to alignment of in-phase (I) and quadrature (Q) data in a quadrature phase shift keying (QPSK) optical transmitter.

BACKGROUND

Next-generation long-haul, fiber-optic communications systems are being designed to operate at 100 gigabits per second over distances of 1,000 kilometers or more. Data are encoded on an optical carrier signal using a quadrature phase shift keying (QPSK) modulator. In QPSK, symbols are represented by one of four points in the I-Q plane. Thus each symbol represents two bits.

For proper operation, data in I and Q channels of a QPSK system are pattern-aligned; i.e. multi-unit-interval skew between I and Q data is reduced or eliminated. In a laboratory setting, deskewing may be performed manually by using external test instrumentation and observing eye diagrams. Skew can vary across power cycles or clock resets, however. It would be convenient if I/Q alignment could be made part of an automatic, self-calibration procedure that could be done at power-up, after clock resets, or whenever desired in the field.

Thus what are needed are methods for automatic I/Q alignment in QPSK systems. The methods should not depend on advanced features of a MUX. Furthermore the methods should be able to correct skew offsets that are less than one unit interval (UI) of the I or Q data streams.

DETAILED DESCRIPTION

Methods for minimizing I/Q data skew in a QPSK transmitter are now described. In the optical domain, the methods may be applied to each polarization of a dual-polarization QPSK transmitter (DP-QPSK) independently.

In QPSK operation, I and Q carrier signals have a relative phase shift $\Phi$ of $\pi/2$. The methods described here involve operating an I/Q phase control loop to temporarily maintain a zero or $\pi$ phase shift between I and Q carriers. When $\Phi$ is zero or $\pi$, and identical data streams are introduced in the I and Q channels, the average output power observed at the output of a QPSK modulator is indicative of the alignment between I and Q data. Here "average" means average over times much longer (10× or more) than one unit interval of data, or, equivalently, much longer than the reciprocal of the data rate.

When $\Phi=\pi$, for example, minimum data skew corresponds to minimum average output power; when $\Phi=0$, the opposite is true—minimum skew corresponds to maximum average output power. Principles leading to these effects and methods for taking advantage of them to remove skew of less than one unit interval are now described in more detail.

Figure 1:
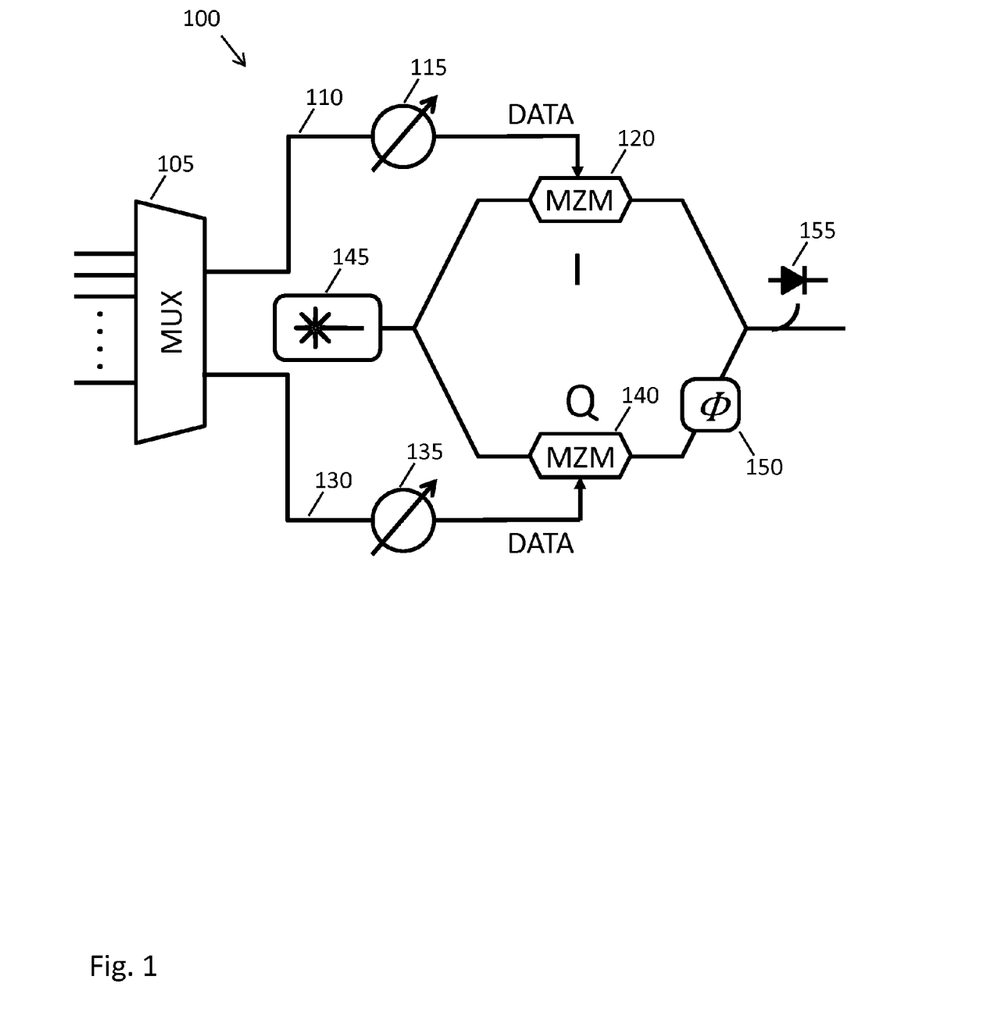
FIG. 1 shows a multiplexer feeding data to I and Q channels of an optical QPSK modulator.

FIG. 1 shows an example of a transmitter system 100 including a multiplexer 105 feeding data to I and Q channels of an optical QPSK modulator. In FIG. 1 multiplexer 105 combines several incoming data lanes into two output data streams 110 and 130. Data stream 110 passes through optional adjustable delay 115 before being input to phase-shift keying (PSK) modulator 120. Similarly, data stream 130 passes through optional adjustable delay 135 before being input to phase-shift keying (PSK) modulator 140. Either adjustable delay 115 or adjustable delay 135 is optional; at least one of them is required so that the relative delay, or skew, between data streams 110 and 130 may be adjusted. PSK modulators 120 and 140 may be realized as Mach-Zehnder modulators. Laser 145 is a light source for the system. Phase controller 150 adjusts the carrier phase $\Phi$ between the outputs of the in-phase 120 and quadrature 140 PSK modulators. Detector 155 measures the average power at the output of the QPSK modulator. Although omitted from the figure for clarity, a return-to-zero (RZ) carver may be placed at the output of laser 145 and optional amplifiers may be inserted between adjustable delay 115 and Mach-Zehnder modulator 120 or between adjustable delay 135 and Mach-Zehnder modulator 140.

Although the methods described herein are done so primarily with reference to optical QPSK systems (e.g., the transmitter system 100), they are also applicable to QPSK systems operating at lower frequencies, e.g. terahertz, microwave, UHF, etc. Component implementations are different at lower frequencies—RF sources instead of lasers, transmission lines instead of optical fibers—but the principles of operation are the same.

Figure 2:
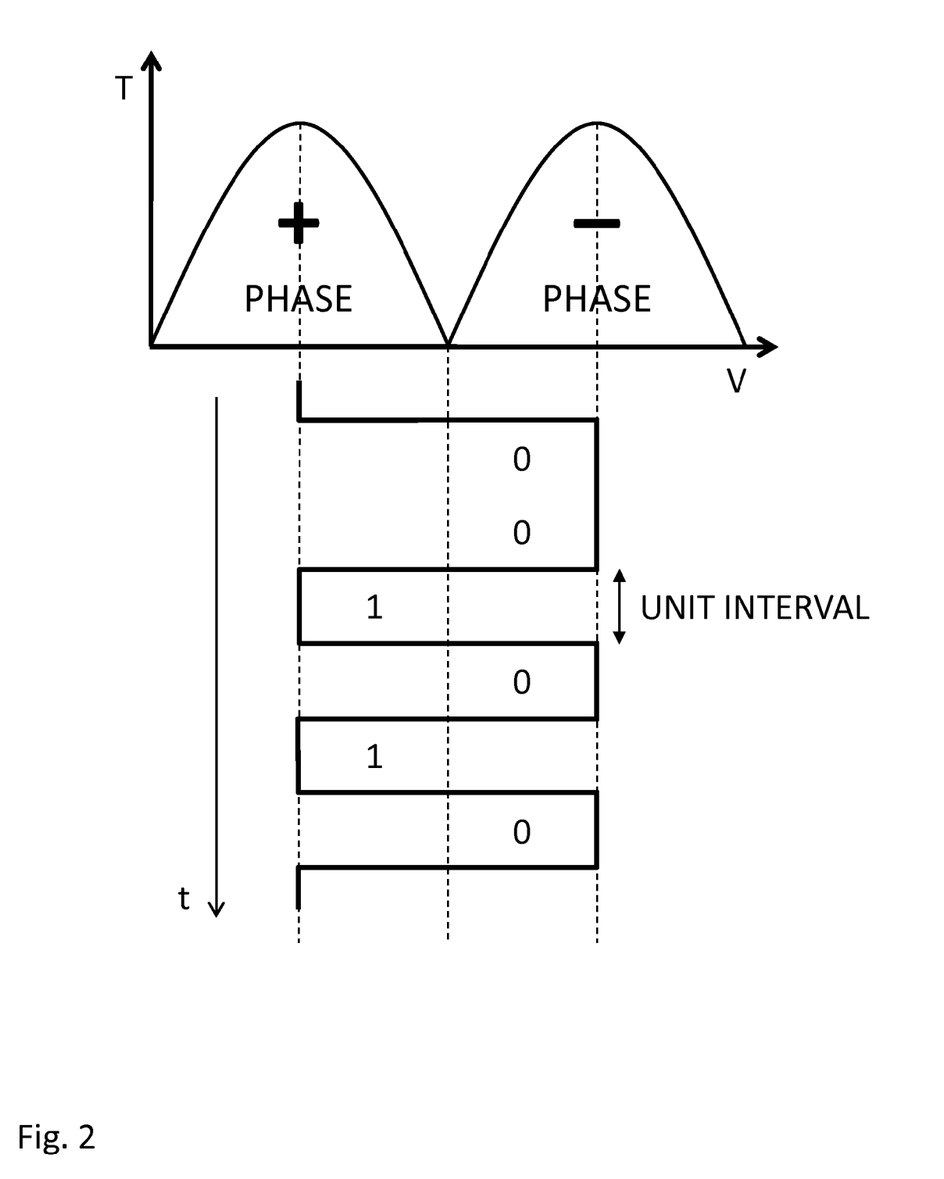
FIG. 2 shows a transfer function for a Mach-Zehnder optical modulator.

FIG. 2 shows a transfer function for a Mach-Zehnder optical modulator. In FIG. 2, transmission of a Mach-Zehnder modulator, T, is graphed along a horizontal direction as a function of applied voltage, V. Data, in the form of voltage levels, V, plotted in a vertical direction versus time, t, is also shown. A Mach-Zehnder modulator may be biased such that a voltage level representing logical zero generates maximum transmission with a certain carrier phase, denoted by "+" in the figure. Voltage representing logical one also generates maximum transmission, but with a $\pi$ phase shift, denoted by "–" in the figure.

Figure 3:
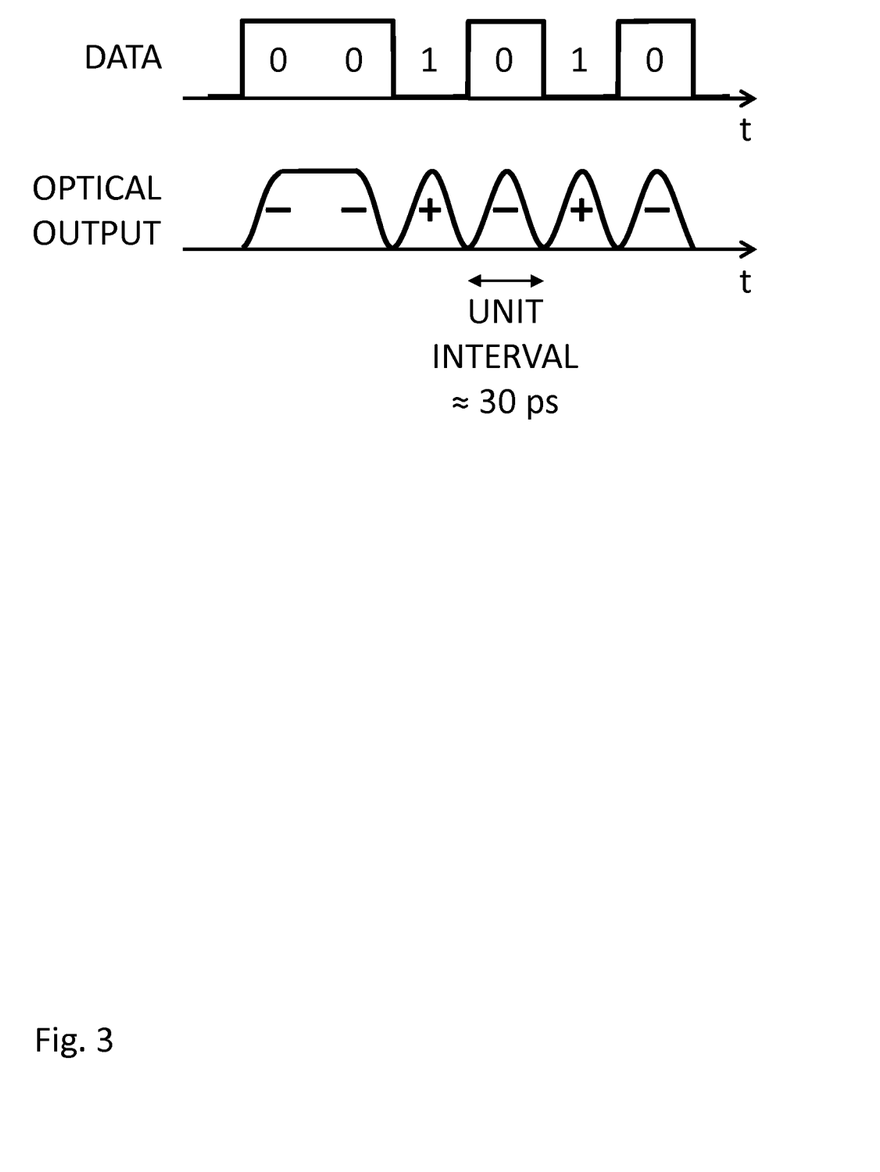
FIG. 3 shows the relationship between input data and output optical signals in a Mach-Zehnder optical modulator.

FIG. 3 shows the relationship between input data and output optical signals in a Mach-Zehnder optical modulator. An incoming data stream of logical ones and zeroes encoded as voltages is converted into equal amplitude light pulses with ones and zeroes represented by 0 or $\pi$ phase shift. Light output is minimized at transitions from zero to one or one to zero. In a 32 Gb/s modulator, as an example, the unit interval or time allotted to one "1" or "0" is approximately 33 ps.

Figure 4:
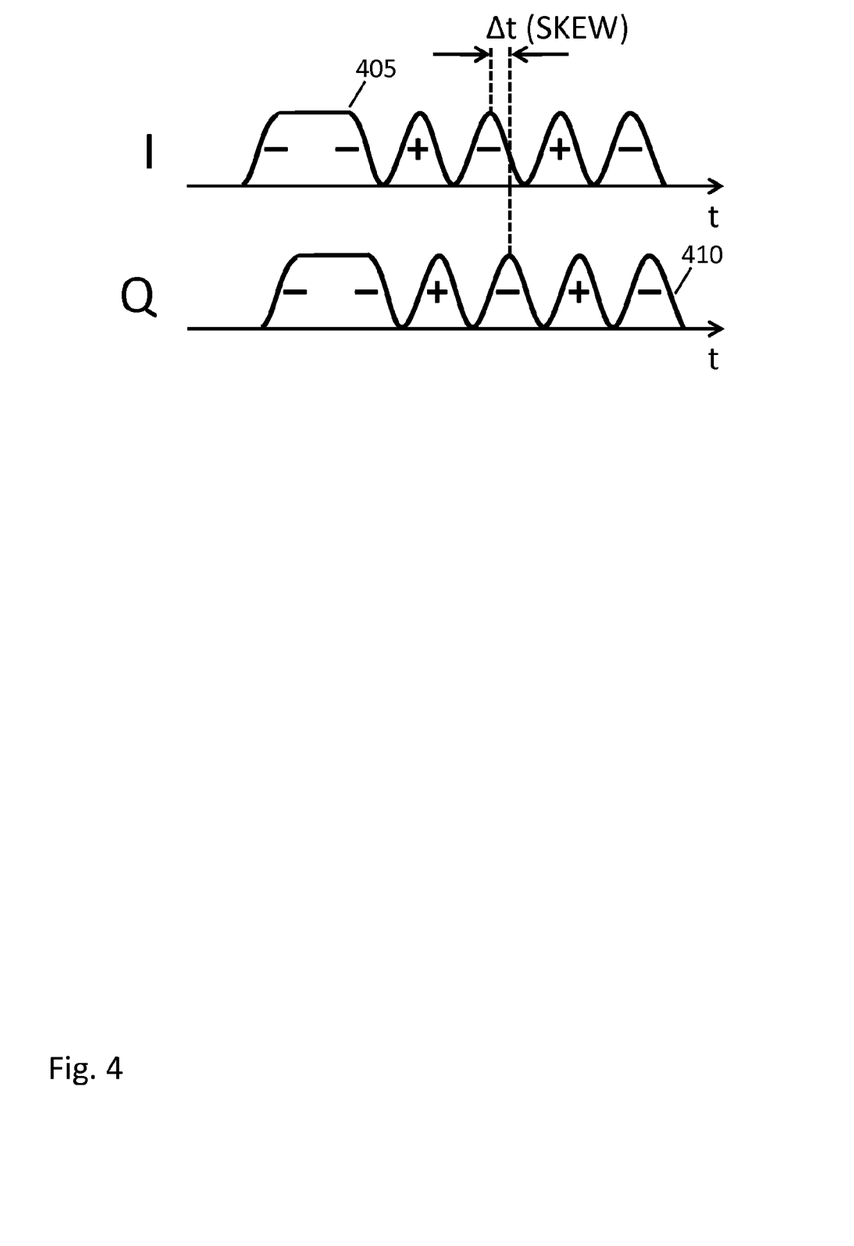
FIG. 4 illustrates skew between I and Q optical signals.

FIG. 4 illustrates skew between I and Q optical signals. In FIG. 4, graphs 405 and 410 depict optical output from Mach-Zehnder modulators in the I and Q branches, respectively, of a system such as that shown in FIG. 1. "+" and "–" indicate the phase of the optical carrier. In FIG. 4, the data in the I and Q channels is the same, but there is a time delay or skew between them indicated by "Δt". A goal of I/Q alignment methods described in this specification is to minimize the time delay Δt by adjusting the skew between the I and Q channels in time increments that are shorter than 1 unit interval (UI).

Figure 5A:
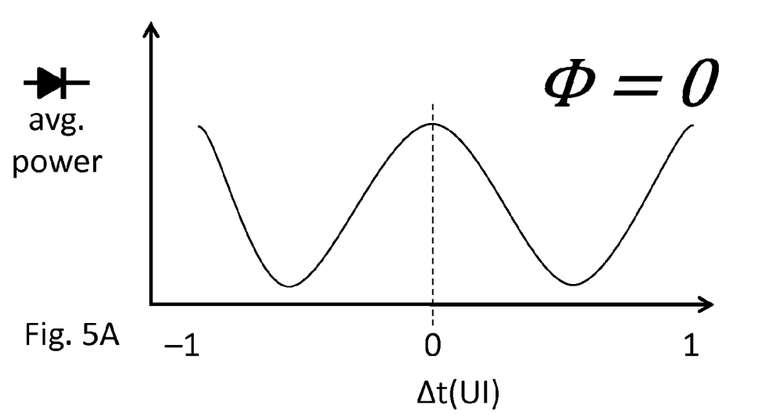
FIGS. 5A and 5B show graphs of average power detected versus skew.

In operation, the carrier phase Φ difference between the I and Q data channels is π/2. On one hand, if the carrier phase Φ difference between the I and Q data channels is set to zero, then when the data in two channels is the same, minimum skew corresponds to maximum average power in the combined output of the QPSK modulator due to constructive interference. The relation between skew and average power for this case is shown in FIG. 5A. On the other hand, if the carrier phase Φ difference between the I and Q data channels is set to π, then when the data in two channels is the same, minimum skew corresponds to minimum average power in the combined output of the QPSK modulator due to destructive interference. The relation between skew and average power for this case is shown in FIG. 5B.

Figure 5B:
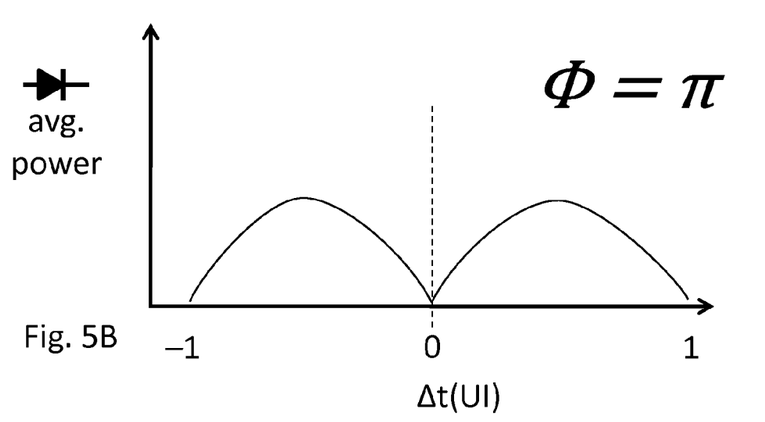

In addition, FIGS. 5A and 5B show how measuring average modulator output power as a function of skew and carrier phase permits monitoring and control of skew between I and Q data.

If the input data (identical copies to I and Q) is an alternating series of bits (e.g. 10101010101010, i.e. a square wave pattern), then minima and maxima in average power can be observed at integer UI skews: $-n, -(n-1), \ldots, -2, -1, 0, 1, 2, \ldots, (n-1), n$ (where n is an integer). The alternating series of bits can have other periods (e.g. 110011001100 ...) or can have different duty cycles (e.g., 111011101110 ...) Thus, an alternating series of bits provides a way to eliminate sub-UI skew while leaving modulo-one UI skew ambiguity. In some embodiments, the ambiguity may be removed by switching to a pseudo-random bit stream and adjusting skew in one-UI increments.

In practice it may be easier to precisely identify a minimum, rather than a maximum average power at the QPSK output. If it is more convenient, or perhaps only possible, to set Φ=0 rather than Φ=π, then complementary, rather than identical, data streams may be sent to the I and Q data inputs. (The complement to a series of bits is the same series except "0" is replaced by "1" and vice versa.) For example if "1010101010101010" is sent to I and its complement "0101010101010101" is sent to Q, then minimum skew with Φ=0 can coincide with minimum QPSK average output power.

Figure 6A:
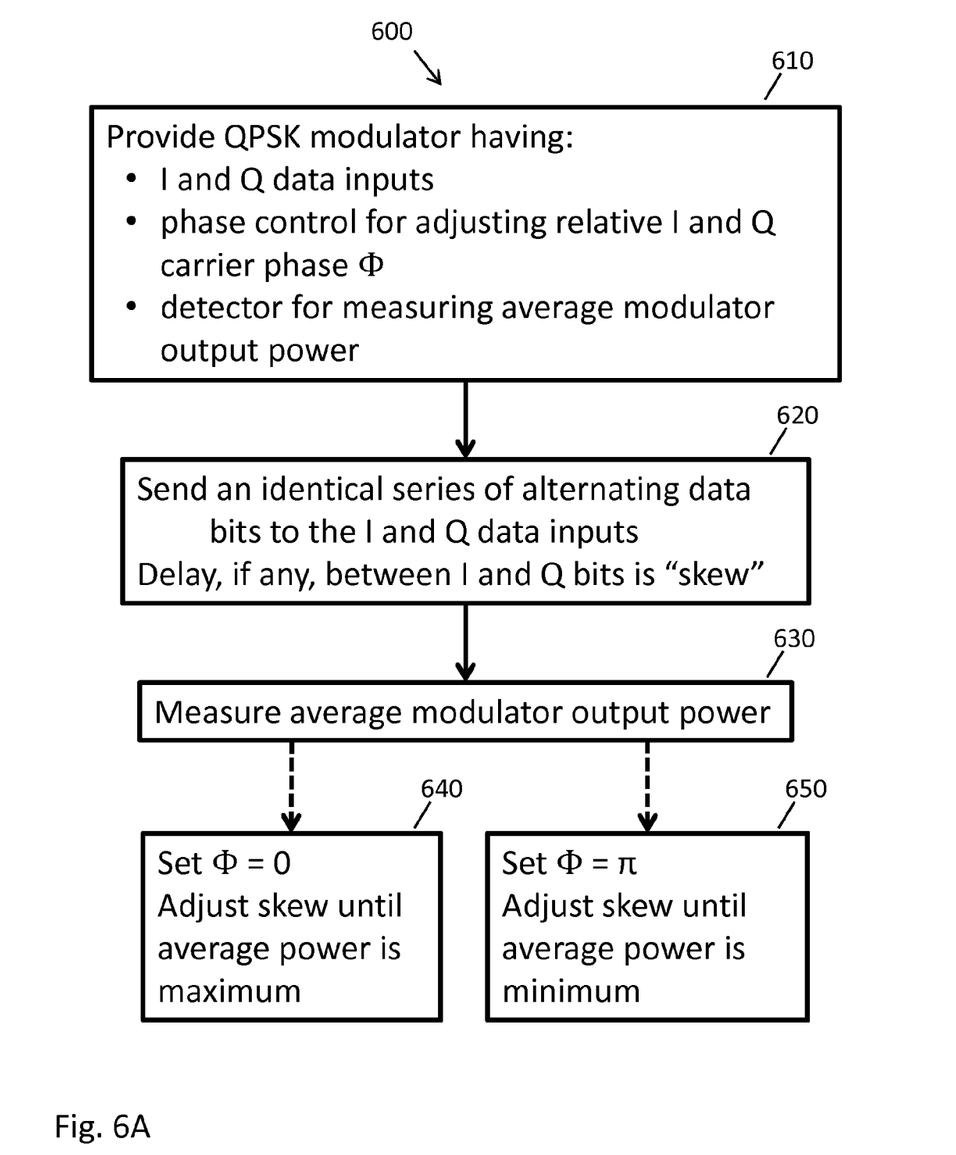
FIGS. 6A and 6B are a flow chart for an I/Q data alignment method using identical data streams.
Figure 6B:
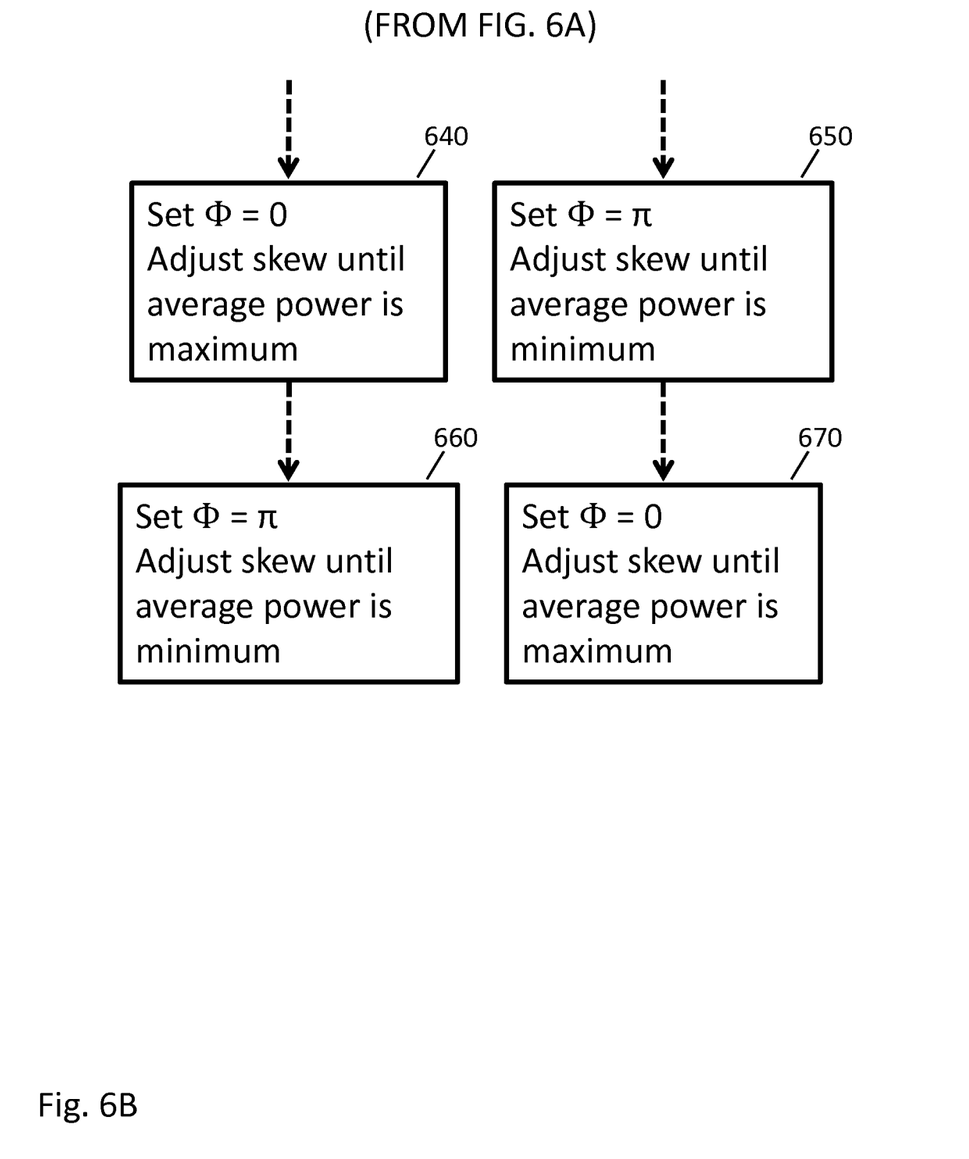

FIGS. 6A and 6B are flow charts for an example of an I/Q data alignment method 600 using identical data streams. At step 610, a QPSK modulator is provided having I and Q data inputs, phase control for adjusting relative I and Q carrier phase Φ, and a detector for measuring average modulator output power. At 620, identical copies of a periodical series of data bits are sent to the I and Q data inputs where the delay, if any, between the identical I and Q copies of the periodical data bit series is the skew. The periodical series of data bits can have a predetermined period and a predetermined duty cycle. The period and the duty cycle of the periodical series of data bits can be preset and/or programmed in software, firmware and the like. At 630, the average modulator output power is measured. At 640, the relative I and Q carrier phase is set to Φ=0 and the skew is adjusted until the average modulator output power is maximum. At 650, the relative I and Q carrier phase is set to Φ=π and the skew is adjusted until the average modulator output power is minimum. At 660, the relative I and Q carrier phase can be optionally set to Φ=π and the skew can be optionally adjusted until the average modulator output power is minimum. Alternatively at 670, the relative I and Q carrier phase can be optionally set to Φ=0 and the skew can be optionally adjusted until the average modulator output power is maximum.

Figure 7A:
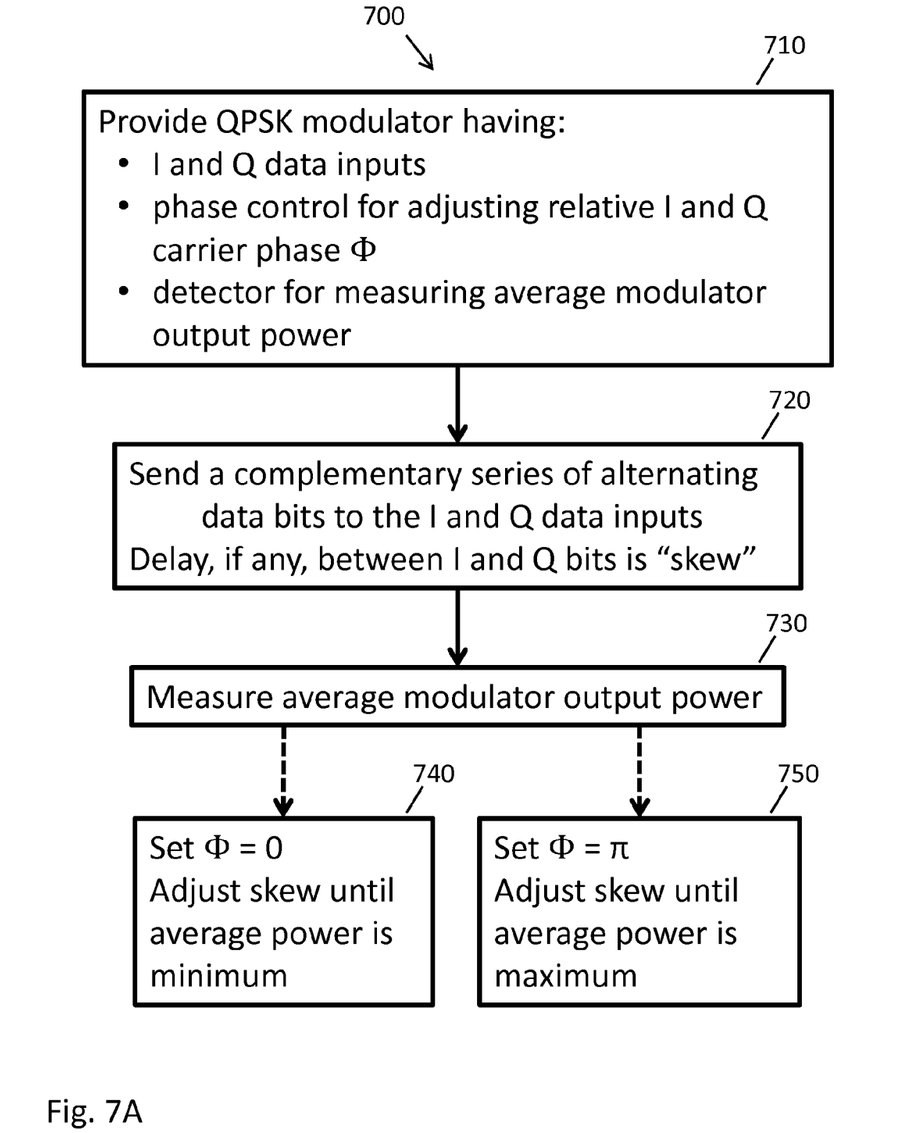
FIGS. 7A and 7B are a flow chart for an I/Q data alignment method using complementary data streams.
Figure 7B:
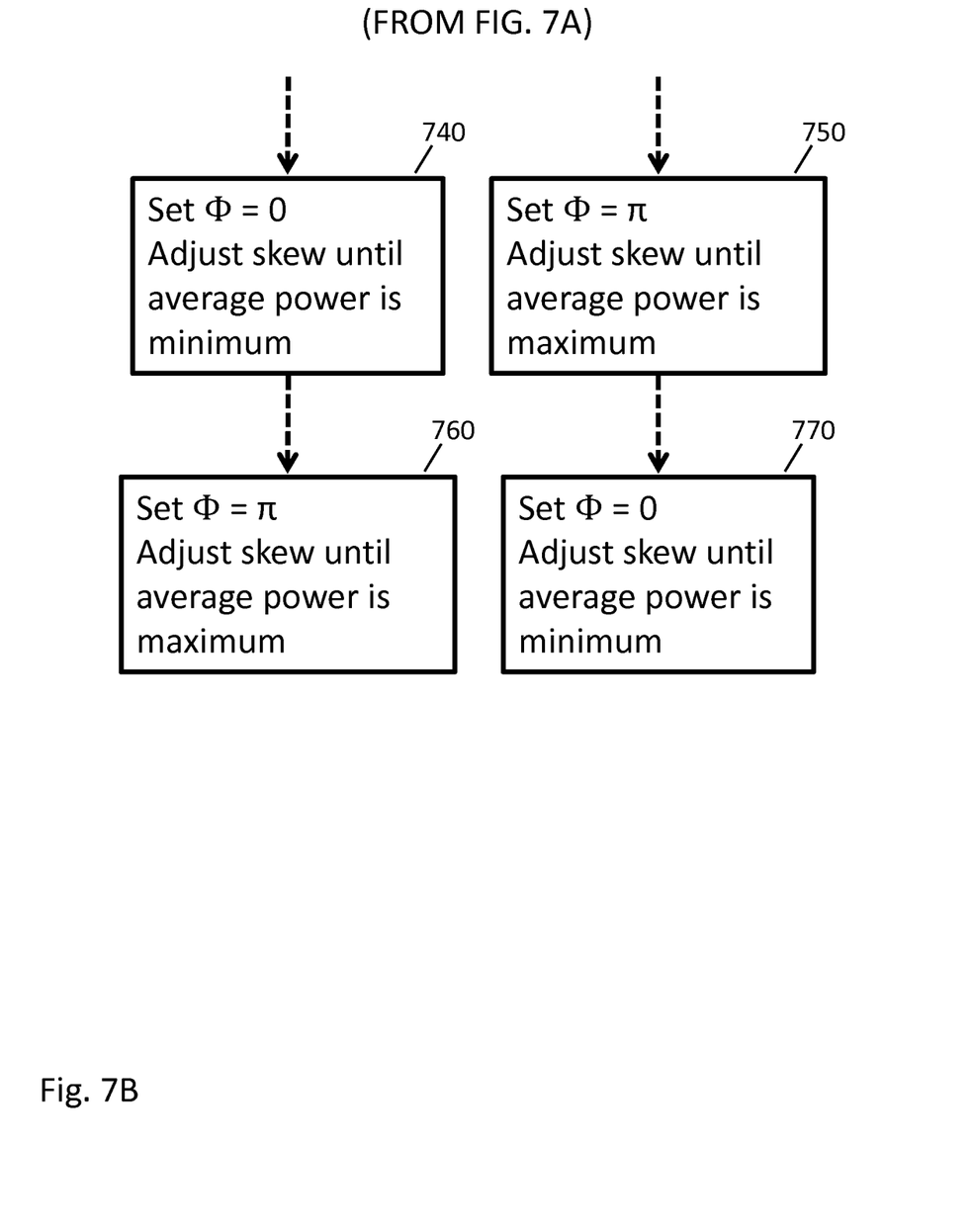

As explained above, zero skew coincides with minimum output power (Φ=0) or maximum output power (Φ=π) if complementary, rather than identical, I and Q data streams are used. FIGS. 7A and 7B are a flow charts of an example of an I/Q data alignment method 700 using complementary data streams. At step 710, a QPSK modulator is provided having I and Q data inputs, phase control for adjusting relative I and Q carrier phase Φ, and a detector for measuring average modulator output power. At 720, complementary copies of a periodical series of data bits are sent to the I and Q data inputs where the delay, if any, between the complementary I and Q copies of the periodical data bit series is the skew. As described above, the periodical series of data bits can have a predetermined period and a predetermined duty cycle. The period and the duty cycle of the periodical series of data bits can be preset and/or programmed in software, firmware and the like. At 730, the average modulator output power is measured. At 740, the relative I and Q carrier phase is set to Φ=0 and the skew is adjusted until the average modulator output power is minimum. At 750, the relative I and Q carrier phase is set to Φ=π and the skew is adjusted until the average modulator output power is maximum. At 760, the relative I and Q carrier phase can be optionally set to Φ=π and the skew can be optionally adjusted until the average modulator output power is maximum. Alternatively at 770, the relative I and Q carrier phase can be optionally set to Φ=0 and the skew can be optionally adjusted until the average modulator output power is minimum.

The methods described in this specification may be performed automatically after power cycles, clock resets or other disturbances, or they may be performed periodically. (For periodic operation, a disturbance that triggers deskewing methods may be the expiration of a predetermined time period.) An automated system for deskewing may be realized as part of a QPSK transmitter, e.g., as electronic circuitry communicatively coupled with the QPSK modulator. For the example transmitter system 100 illustrated in FIG. 1, control and interface circuits for adjustable delays 115 and 135, phase controller 150 and detector 155 may be included in transmitter ASICs. In this manner, a QPSK transmitter can automatically switch between a normal operating mode (Φ=π/2) and a data skew monitoring or adjustment mode (Φ=0 or π).

The techniques described in this document can be implemented using an apparatus, a method, a system, or any combination of an apparatus, methods, and systems. Implementations of the subject matter and the operations described in this document can be configured in digital electronic circuitry, or in computer software, firmware, or hardware, including the structures disclosed in this document and their structural equivalents, or in combinations of one or more of them. For a hardware implementation, the embodiments (or modules thereof) can be implemented within one or more application specific integrated circuits (ASICs), mixed signal circuits, digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

While this document contains many specific implementation details, these should not be construed as limitations on the scope of any inventions or of what may be claimed, but rather as descriptions of features specific to particular implementations of particular inventions. Certain features that are described in this document in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The above description of the disclosed implementations is provided to enable any person skilled in the art to make or use the disclosure. Various modifications to these implementations will be readily apparent to those skilled in the art, and the principles defined herein may be applied to other implementations without departing from the scope of the disclosure. Thus, the disclosure is not intended to be limited to the implementations shown herein but is to be accorded the widest scope consistent with the principles and novel features disclosed herein.

What is claimed is:

1. A method for monitoring and aligning in-phase (I) and quadrature (Q) data in a quadrature phase shift keying (QPSK) modulator comprising:
   sending a series of data bits to an I data channel of the QPSK modulator and a copy of the series of data bits to a Q data channel of the QPSK modulator, the series of data bits and the copy of the series of data bits having a relative skew; and
   measuring average modulator output power as a function of the relative skew and carrier phase $\Phi$ between I and Q data channels at least in part by
      adjusting, with a phase control, the relative carrier phase $\Phi$,
      adjusting the relative skew by fractions of unit-interval for the adjusted relative carrier phase $\Phi$,
      detecting, with a detector, the average modulator output power for combinations of the adjusted relative phase $\Phi$ and of the adjusted relative skew, and
      removing the relative skew by minimizing the measured average modulator output power when $\Phi=\pi$, or by maximizing the measured average modulator output power when $\Phi=0$.

2. The method of claim 1, wherein the series of data bits comprises a stream of alternating ones and zeroes.

3. The method of claim 1, wherein the QPSK modulator is an optical QPSK modulator.

4. The method of claim 1, wherein the QPSK modulator is a dual-polarization optical QPSK (DP-QPSK) modulator, and the steps of claim 1 are applied to each polarization of the DP-QPSK modulator independently.

5. A method for monitoring and aligning in-phase (I) and quadrature (Q) data in a quadrature phase shift keying (QPSK) modulator comprising:
   sending a series of data bits to an I data channel of the QPSK modulator and a complementary series of data bits to a Q data channel of the QPSK modulator, the series of data bits and the complementary series of data bits having a relative skew; and
   measuring average modulator output power as a function of the relative skew and carrier phase $\Phi$ between I and Q data channels at least in part by
      adjusting, with a phase control, the relative carrier phase $\Phi$,
      adjusting, with at least one adjustable data delay, the relative skew by fractions of unit-interval for the adjusted relative carrier phase $\Phi$,
      detecting, with a detector, the average modulator output power for combinations of the adjusted relative phase $\Phi$ and of the adjusted relative skew, and
      removing the relative skew by maximizing the measured average modulator output power when $\Phi=\pi$, or by minimizing the measured average modulator output power when $\pi=0$.

6. The method of claim 5, wherein the series of data bits comprises a stream of alternating ones and zeroes.

7. The method of claim 5, wherein the QPSK modulator is an optical QPSK modulator.

8. The method of claim 5, wherein the QPSK modulator is a dual-polarization optical QPSK (DP-QPSK) modulator, and the steps of claim 1 are applied to each polarization of the DP-QPSK modulator independently.

9. Electronic circuitry for automatically aligning in-phase (I) and quadrature (Q) data in a quadrature phase shift keying (QPSK) modulator, the electronic circuitry comprising:
   a controller communicatively coupled with I and Q data channels of the QPSK modulator;
   an adjustable data delay;
   a phase control for adjusting relative carrier phase $\Phi$ between I and Q data channels of the QPSK modulator;
   a detector coupled to an output of the QPSK modulator to detect average modulator output power, wherein the controller is configured to
      in response to meeting an alignment criterion, instruct the phase control to change the relative carrier phase from $\Phi=\pi/2$ to $\Phi=0$ or $\pi$, then
      provide a series of data bits to the I data channel and another series of data bits to the Q data channel, the series of data bits and the other series of data bits having a relative skew,
      measure average modulator output power as a function of skew, wherein to perform the measurements the controller is further configured to
         instruct the adjustable data delay to adjust the relative skew by fractions of a unit-interval, read from the detector the average modulator output power for the adjusted relative skew, determine an adjustment of the adjustable data delay corresponding to an extremum of the measured average modulator output power to remove the relative skew, instruct the adjustable data delay to maintain the determined adjustment, and then instruct the phase control to return the relative carrier phase to $\Phi=\pi/2$.

10. The electronic circuitry of claim 9, wherein the alignment criterion is a power cycle or clock reset.

11. The electronic circuitry of claim 9, wherein the alignment criteria is the expiration of a predetermined time period.

12. The electronic circuitry of claim 9, wherein the series of data bits and the other series of data bits are streams of alternating ones and zeroes.

13. The electronic circuitry of claim 12, wherein the other series of data bits is a copy of the series of data bits.

14. The electronic circuitry of claim 12, wherein the other series of data bits is complementary to the series of data bits.

15. The electronic circuitry of claim 9, wherein the QPSK modulator is an optical QPSK modulator.

* * * * *